United States Patent Office.

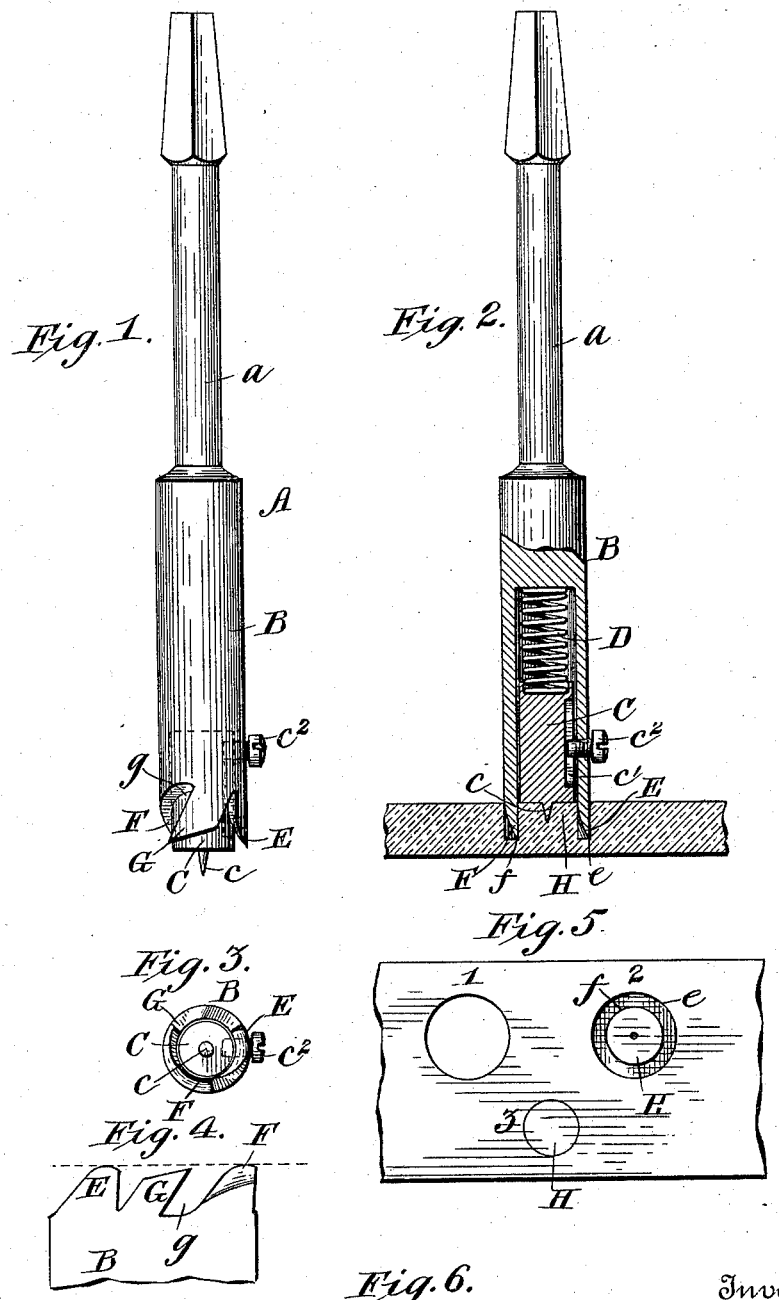

FRIEDRICH EMIL RESCHE, OF DULUTH, MINNESOTA.

PLUG-CUTTING TOOL.

SPECIFICATION forming part of Letters Patent No. 476,312, dated June 7, 1892.

Application filed December 26, 1891. Serial No. 416,214. (No model.)

*To all whom it may concern:*

Be it known that I, FRIEDRICH EMIL RESCHE, a citizen of the United States, residing at Duluth, in the county of St. Louis and State of Minnesota, have invented certain new and useful Improvements in Plug - Cutting Tools; and I do hereby declare the following to be a full, clear, and exact description of the invention, such as will enable others skilled in the art to which it appertains to make and use the same.

My invention relates to a tool for cutting wooden plugs which are used by wood-workers in concealing sunken screw-heads, bolt-heads, and the like, or in closing up an opening left by a removed screw or bolt; and it consists of a hollow stock provided with novel cutting lips or teeth and a clearing lip or tooth and an automatic plug-projector, whereby a plug of uniform width and of any desired thickness is produced, which, after being cut, will be automatically removed from the tool and the tool kept from clogging; and it consists in certain other novel constructions, combinations, and arrangements of parts, as will be hereinafter described and specifically claimed.

In the accompanying drawings, Figure 1 is a side elevation of my improved plug-cutting tool, and Fig. 2 is a partial section and side elevation of the same applied to a piece of wood. Fig. 3 is a bottom view of the tool. Fig. 4 is a diagrammatical view of the lower end of the stock as it would appear if the same were flattened out. Fig. 5 is a section of wood, showing the manner of using my tool; and Fig. 6 is a finished plug.

A in the drawings represents my improved plug-cutting tool, which consists of an ordinary shank $a$, which terminates in a hollow stock B, provided on its lower end with cutting and clearing teeth, while in its interior it is provided with a spring-actuated projector C, which is free to recede as the plug is being cut, and when cut to automatically project the plug from the tool. The plug-projector C is made to fit and slide snugly in the stock and is kept in a normal forward or lowered position by a spring D, which latter is of slightly less diameter than the bore of the stock and rests in a socket-recess in the upper end of the projector, so that when the spring is compressed sufficient room is provided for the lateral expansion of the same without the spring coming in contact with the sides of the stock and causing the projector to bind or work hard. The plug-projector is also provided on its outer end with a centering-point $c$, which enables an operator to accurately cut a plug at any desired place on a piece of wood and forms a center around which the teeth revolve in cutting a plug. A vertical groove $c'$ is formed in the side of the projector, in which the end of a screw $c^2$ is inserted through a hole in the stock and is adapted to slide up and down in the same as the plug-projector moves backward or forward. By having the groove formed on the projector and closed at its ends, instead of being formed on the outside of the stock and a pin passed through, the groove is perfectly protected from the entrance of chips or dirt, which would prevent the projector having a free movement.

The stock is provided at its lower edge with two saw-tooth-like cutting teeth or lips E and F and preferably one clearing tooth or lip G, though in cutting very large plugs it might be desirable to use two clearing-teeth. The cutting-teeth E and F are so constructed and arranged that the tooth E makes an outer cut $e$ and the tooth F makes an inner cut $f$, as clearly shown in Figs. 2 and 5, and the wood between these two cuts or grooves is removed by the clearing-tooth G, which is made slightly shorter and much thicker than the other teeth, having its edge radial to the stock, and follows directly in their rear, the cut wood passing out in the form of chips at the side of the teeth. The clearing-tooth is only sharpened on its front lower end or point and is made shorter than the cutting-teeth E and F, so as not to cut into the uncut wood, but of a sufficient length to remove the wood between the two cuts $e$ and $f$ as fast as cut.

In Fig. 5, 2 shows how the wood is cut by my improved tool. The cutting-edge of the tooth E is on the circumference of the lower edge of the tool and is formed by beveling the inner surface of the stock outward from the interior of its base and cuts the outer circle e, while the cutting-edge of the tooth F, which cuts the inner circle f, is beveled downward and inward from the circumference. The tooth E has its cutting-edge on a circle corresponding in diameter with the outer diameter of the stock and its inner surface upwardly beveled and terminated on a circle corresponding in diameter to the inner diameter of said stock, and the rear of said tooth being cut away on an incline and having a thickness at its terminus about equal to the metal forming the stock. The tooth F has its cutting-edge formed by beveling the metal stock from its inner to its outer circumference and cutting away the metal diagonally rearward of said cutting-edge to a height corresponding to the termination of the rear portion of the tooth E. The clearing-tooth G has a transverse clearing-edge about equal in width to the thickness of the metal of the stock and its front surface set far enough back and inclined from bottom to top to form a large escape-passage g. By thus constructing the teeth—arranging them in a circle—a plug of uniform width throughout its length is cut, which will serve at any point of its length to stop up holes of uniform diameter. If the plugs were made quite long, they could be sawed into a number of small plugs of the same diameter. This is a great advantage over plugs which are cut conical or tapering in form, as when such shaped plugs are inserted in a screw-hole they only bear at one point on the sides of the hole, and consequently are not as secure as plugs of the same diameter throughout and which bear on the sides of the hole throughout the entire length of the plug. If it were desired to cut a long conical-shaped plug into a number of smaller plugs, they would all be of different diameters. With my construction as the tool is revolved the teeth are embedded deeper into the wood and the center core of wood, which forms the plug H, is forced up into the bore of the stock, the spring actuated projector receding when the pressure is brought to bear upon it, and when the teeth have cut entirely through the wood the finished plug is automatically thrown out of the stock. By forming the stock with comparatively short hard-steel lips or teeth made integral therewith plugs of uniform diameter can be cut from hard as well as well as soft wood with and against the grain of the wood without the liability of the teeth spreading, bending, or breaking. The opening g between the front edge of the clearing-tooth G and rear edge of the inner cutting-tooth E is made of considerable greater width at its bottom and between its sides than the other openings between the teeth, so that the chips can very readily at all times pass out at this point, no matter how far the tool may be embedded in the wood. It will also be seen that the rear edges of all the teeth have a rearward inclination from their bottom to their upward termination, and thus approximately V-shaped spaces are formed between the cutting-teeth and an oblique approximately-parallel-sided space formed forward of the clearing-tooth, which latter tooth has an oblique front edge above its clearing-point.

In Fig. 5 I have shown a section of wood which illustrates the operation and use of my invention. 2 in said figure shows a plug partially cut from the wood and also showing very clearly the outer and inner circular cuts made by the outer and inner cutting-teeth and the wood removed between the two cuts by the clearing-tooth. 1 in said figure represents the size of hole made in forming a plug of the size shown in Fig. 6, and 3 represents the plug inserted in a screw or bolt hole to conceal the same and present a finished appearance much superior to holes which are filled up with putty.

What I claim as my invention is—

1. A cylindrical revolving tool for cutting wooden plugs of uniform diameter throughout their lengths, comprising a cylindrical hollow stock having integral segmental teeth E, F, and G formed on its lower end, the tooth E having its cutting-edge on a circle corresponding in diameter with the outer diameter of the stock and its inner surface upwardly beveled and terminated on a circle corresponding in diameter to the inner diameter of said stock and the rear of said tooth cut away on an incline and having a thickness at its terminus about equal to the metal forming the stock, the tooth F having its cutting-edge formed by beveling the metal stock from its inner to its outer circumference and cutting away the metal diagonally rearward of said cutting-edge to a height corresponding to the termination of the rear portion of the tooth E, and the clearing-tooth G having a transverse clearing edge about equal in width to the thickness of the metal of the stock and its front surface being set far enough back and inclined from bottom to top to form a large escape-passage g, substantially as and for the purpose described.

2. The combination of the automatic spring-actuated centering and ejecting plug C with a cylindrical hollow stock having integral segmental teeth E, F, and G formed on its lower end, the tooth E having its cutting-edge on a circle corresponding with the outer diameter of the stock and its inner surface upwardly beveled and terminated on a circle corresponding to the inner diameter of said stock, the front edge of said tooth being nearly vertical and the rear of said tooth being cut away on an incline and having a thickness at its terminus about equal to the metal forming the stock, the tooth F having its cutting-edge formed by beveling the metal stock from its inner to its outer circumference and cutting away the metal diagonally rearward of said cutting-edge to a height corresponding to the termination of the rear portion of the tooth E, and the clearing-tooth G having a transverse clearing edge on nearly the same plane with the lower edges of the teeth E and F and a width about equal to the thickness of the metal of the stock and its front surface being set far enough back and inclined from bottom to top to form a large escape-passage g, substantially as and for the purpose described.

In testimony whereof I hereunto affix my signature in presence of two witnesses.

FRIEDRICH EMIL RESCHE.

Witnesses:
C. O. BALDWIN,
O. E. W. MILLER.